US010572124B2

(12) United States Patent
Ryman et al.

(10) Patent No.: US 10,572,124 B2
(45) Date of Patent: Feb. 25, 2020

(54) BOUND BASED CONTEXTUAL ZOOM

(71) Applicant: Citrix Systems, Inc., Ft. Lauderdale, FL (US)

(72) Inventors: Paul Adam Ryman, Sydney (AU); Jayadev Marulappa Niranjanmurthy, Sydney (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 499 days.

(21) Appl. No.: 13/960,740

(22) Filed: Aug. 6, 2013

(65) Prior Publication Data
US 2014/0344736 A1    Nov. 20, 2014

Related U.S. Application Data

(60) Provisional application No. 61/825,513, filed on May 20, 2013.

(51) Int. Cl.
*G06F 3/0484* (2013.01)
*G06F 9/451* (2018.01)
(Continued)

(52) U.S. Cl.
CPC .......... *G06F 3/04845* (2013.01); *G06F 3/017* (2013.01); *G06F 3/0482* (2013.01);
(Continued)

(58) Field of Classification Search
CPC ............... G06F 3/0488; G06F 3/04886; G06F 3/04883; G06F 3/04845; G06F 3/017; G06F 3/0482; G06F 3/04842
See application file for complete search history.

(56) References Cited

U.S. PATENT DOCUMENTS 8,149,249 B1 *  4/2012  Oplinger .................. G09G 5/00
                                                      345/661
8,745,525 B1 *  6/2014  Roskind .............. G06F 3/04883
                                                      715/788
(Continued)

FOREIGN PATENT DOCUMENTS

EP            1942401 A1     7/2008

OTHER PUBLICATIONS

Android-pinch A collection of inherited views that addmulti-touch zoom ("pinch"), https://code.google.com/p/android-pinch, retrieved Aug. 6, 2013, pp. 1-3.
(Continued)

*Primary Examiner* — Amy Ng
*Assistant Examiner* — Sajeda Muhebbullah
(74) *Attorney, Agent, or Firm* — Banner & Witcoff, Ltd.

(57) ABSTRACT

Methods and systems for bound based contextual zoom are disclosed. Legacy WINDOWS desktop and web applications were designed for a mouse or other high-precision pointing device, and as such, small controls and closely grouped controls/icons were commonly designed/used on the screen. Interacting with such applications remoted to a touch-based device (e.g., a smartphone or tablet) is difficult. Bound based contextual zoom overcomes at least some of these limitations by permitting a user to zoom in on an area of interest within an application or desktop, and for a period of time long enough to complete the touch interaction. The area zoomed might be a group of controls on a ribbon bar, the minimize/maximize/close buttons in the top-right corner of a window, a group of form input controls, or any other natural cluster of related user interface (UI) elements. The size of the area zoomed and the zoom factor applied are calculated to allow a user to complete their task without overly obscuring the rest of the application/desktop.

19 Claims, 15 Drawing Sheets

(51) Int. Cl.
*G06F 3/0482* (2013.01)
*G06F 3/01* (2006.01)
*G06F 3/0488* (2013.01)

(52) U.S. Cl.
CPC ........ *G06F 3/0488* (2013.01); *G06F 3/04842* (2013.01); *G06F 3/04883* (2013.01); *G06F 3/04886* (2013.01); *G06F 9/452* (2018.02)

(56) References Cited

U.S. PATENT DOCUMENTS

| | | | |
|---|---|---|---|
| 8,832,588 B1* | 9/2014 | Kerzner | G06F 3/048 715/212 |
| 2005/0177783 A1* | 8/2005 | Agrawala | G06F 3/04883 715/230 |
| 2007/0198950 A1* | 8/2007 | Dodge | G06F 3/0481 715/815 |
| 2008/0094368 A1* | 4/2008 | Ording | G06F 3/0488 345/173 |
| 2012/0084663 A1 | 4/2012 | Momchilov et al. | |
| 2012/0159402 A1* | 6/2012 | Nurmi | G06F 3/04883 715/863 |
| 2012/0218468 A1* | 8/2012 | Tan | H04N 21/45455 348/441 |
| 2012/0296959 A1* | 11/2012 | Momchilov | G06F 9/54 709/203 |
| 2013/0021380 A1* | 1/2013 | Park | G06F 3/0233 345/660 |
| 2013/0091543 A1 | 4/2013 | Wade et al. | |
| 2014/0109004 A1* | 4/2014 | Sadhvani | G06F 3/0482 715/810 |

OTHER PUBLICATIONS

Beta version of Chrome for Android 4.0 released, John Callaham, www.neowin.net/news/beta-version-of-chrom-for-android-40-released, retrieved Aug. 6, 2013, pp. 1-27.

Bringing Google Chrome to Android, Peter Beverloo, published on Feb. 7, 2012, http://peter.sh/2012/02/brining-google-chrome-to-android, retrieved Aug. 6, 2013, 4 pages.

Google Chrome for Android, en.wikipedia.org/wiki/Google_Chrome_for_Android, retrieved Aug. 6, 2013, pp. 1-7.

Google's Chrome for Android: A hands-on tour, JR Raphael, blogs.comptuerworld.com/19696/google_chrome_android, retrieved Aug. 6, 2013, pp. 1-9.

ThunderHawk (web browser), en.wikipedia.org/wiki/ThunderHawk_(web_browser), retrieved Aug. 6, 2013, pp. 1-4.

Unity Touch formerly known as AppShift—easier access to what you really want . . . Posted Feb. 26, 2013 by Stephane Asselin in EUC in General, myeuc.net/2013/02/26/unity-touch-formerly-known-as-appshift-easier-access-to-what-you-really-want, retrieved Aug. 6, 2013, pp. 1-2.

VMware Horizon View Unity Touch is awesome! See this!, www.thatsmyview.net/2013/03/15/vmware-horizon-view-unity-touch-is-awesome-see-this, retrieved Aug. 6, 2013, pp. 1-10.

What is VMware Project AppShift?—Definition from Whatis.com, searchconsumerization.techtarget.com/definition/VMware-Project-AppShift, retrieved Aug. 6, 2013, pp. 1-15.

What is VMware Unity Touch?—Definition from Whatis.com, searchconsumerization.techtarget.com/definitionVMware-Unity-Touch, retrieved Aug. 6, 2013, pp. 1-15.

International Search Report, dated Jul. 29, 2014, International Application No. PCT/US2014/038763, 11 pages.

* cited by examiner

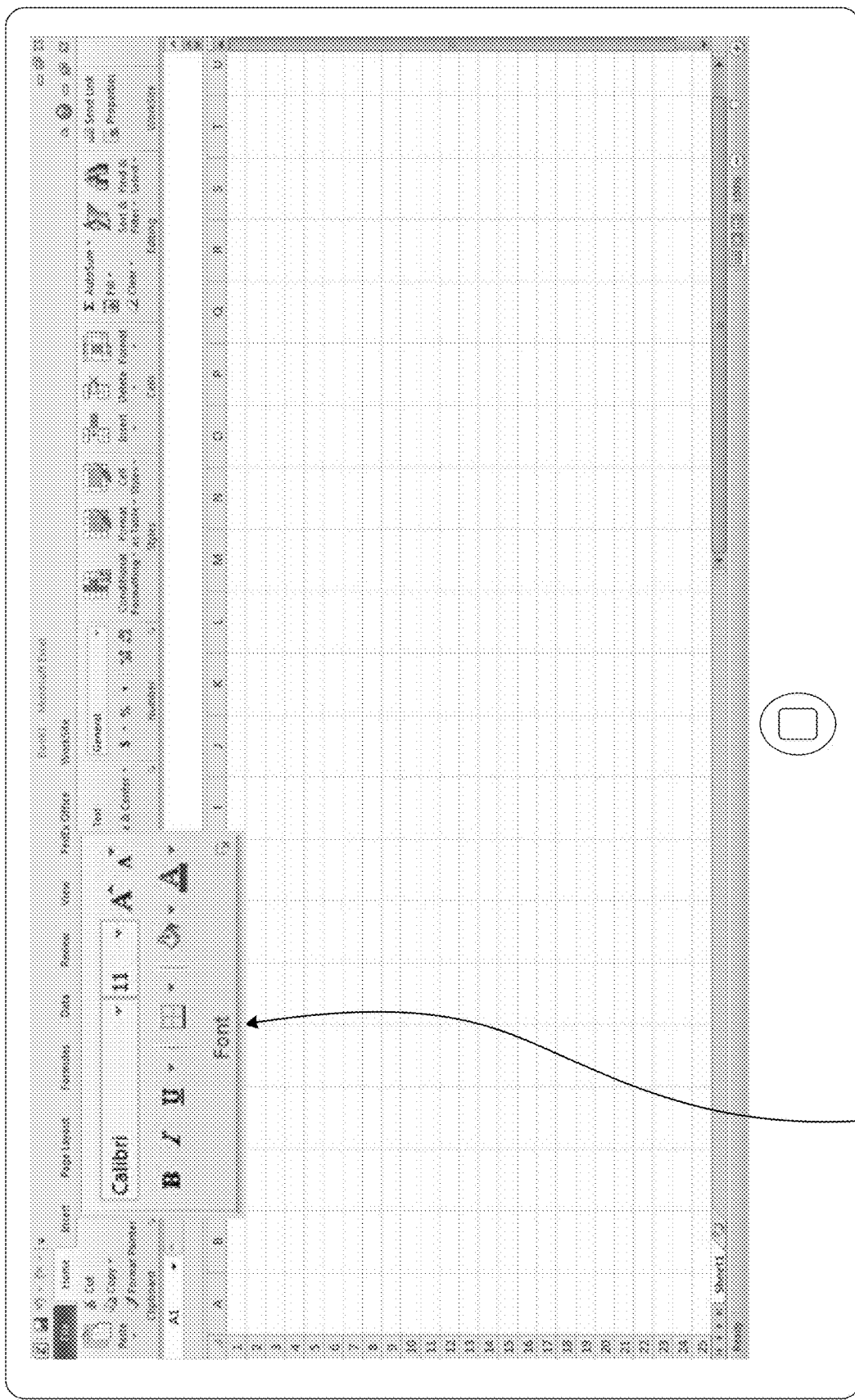

BOUND BASED CONTEXTUAL ZOOM

This application claims priority from U.S. Provisional Patent Application Ser. No. 61/825,513, filed May 20, 2013, which is herein incorporated by reference in its entirety.

FIELD

Aspects described herein generally relate to improved methods and system of user-device interaction in non-virtual and virtual legacy desktops/applications.

BACKGROUND

A computing device may be touch-enabled such that a user provides input via touch gestures at a touchscreen of the device. Those familiar with touch-enabled devices will appreciate that a user may execute various functions by performing particular motions on the touchscreen. Examples of touch gestures include a tap gesture, a double-tap gesture, a long press gesture, a scroll gesture, a pan gesture, a flick gesture, a pinch gesture, and so forth. The operating system of the device may interpret the gesture to identify the type of gesture performed, and provide the gesture information to an application at the device. The application may pair a touch gesture with a particular function that executes upon receipt of the touch gesture. In one example, an application may pair a pinch open gesture with a zoom in function and pair a pinch close gesture with a zoom out function. As another example, an application may pair a pan gesture with a pan function that pans the display at the application or device.

Recent advances in virtualization technology, however, allow touch-enabled computing devices to access virtualized applications operating remotely relative to the device. With this technology, a user may interact with the virtualized application as if it were running natively at the computing device. Many of the virtualized applications may be designed for execution at a desktop computing device in which a user utilizes a pointing device such as a mouse to provide input. A physical pointing device may allow for more precise control and selection at the application. As a result, the graphical user interfaces of these applications may include relatively small icons, menus, and other interface elements suitable for selection using precision pointing devices.

The touchscreen of a touch-enabled device, however, may not provide the precision necessary to select these relative small interface elements. Accordingly, one challenge to presenting virtualized applications at a touch-enabled device involves accurately interpreting a touch gesture to provide a desired response. Another challenge to presenting virtualized applications at a touch-enabled device involves determining whether a touch gesture should be interpreted locally at the native environment or remotely at the virtualized environment. Users may interact with both the native operating system and the virtualized application using touch gestures. In some circumstances, the user may desire the native environment to respond to the touch gesture, while in other circumstances the user may desire the virtualized application to respond to the touch gesture. Legacy applications, such as some WINDOWS desktop applications) that were originally designed for a PC with large screen, mouse, and keyboard, are difficult to navigate using a touchscreen user interface (UI) on a small mobile/portable computing device. Organizations have tried to deploy application and desktop virtualization technologies, such as XenApp or XenDesktop with mobile client agents on platforms such as Apple iOS, Google Android, and Microsoft Windows RT. However, users are faced with problems interacting with these applications because of small form factor mobile devices without a mouse (or other precision pointing device). Without a mouse, interactions like small clickable controls, buttons and other elements spaced close together are difficult to use.

There remain numerous drawbacks and limitations in the prior art as it relates to legacy applications.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a system comprising a client agent application installed on a user computing device in communication via a remote presentation protocol with a virtualized application executing on a virtualization server. The system may comprise at least a user computing device and a virtualization server. The user computing device may comprise a touchscreen user interface (UI) and a computer memory storing computer-executable instructions for a contextual zoom feature (e.g., bound based contextual zoom, or others) that, when executed by a processor, cause the user computing device to receive a predetermined user gesture; transmit information (e.g., one or more coordinate points or other information associated with the predetermined user gesture); receive zoomed metrics; access an image stored in a video buffer; stretch the storage image based on a calculated zoom factor; and display on the touchscreen the zoomed overlay with the image. In some embodiments, the virtualization server may perform or assist in performing various steps, such as the step of calculating particular values. Meanwhile, in other embodiments, the computing device may perform such steps and/or all steps without communication with a server. Alternatively, in yet other embodiments, a hybrid approach may be used in which the virtualization server and the computing device share responsibility for performing various steps and divide that responsibility, for example, in a fixed/static arrangement or a dynamic on-the-fly manner.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 9A and 9B are illustrative before-and-after screen displays of a first contextual zoom overlay in accordance with one or more illustrative aspects described herein.

DETAILED DESCRIPTION

Figure 1:
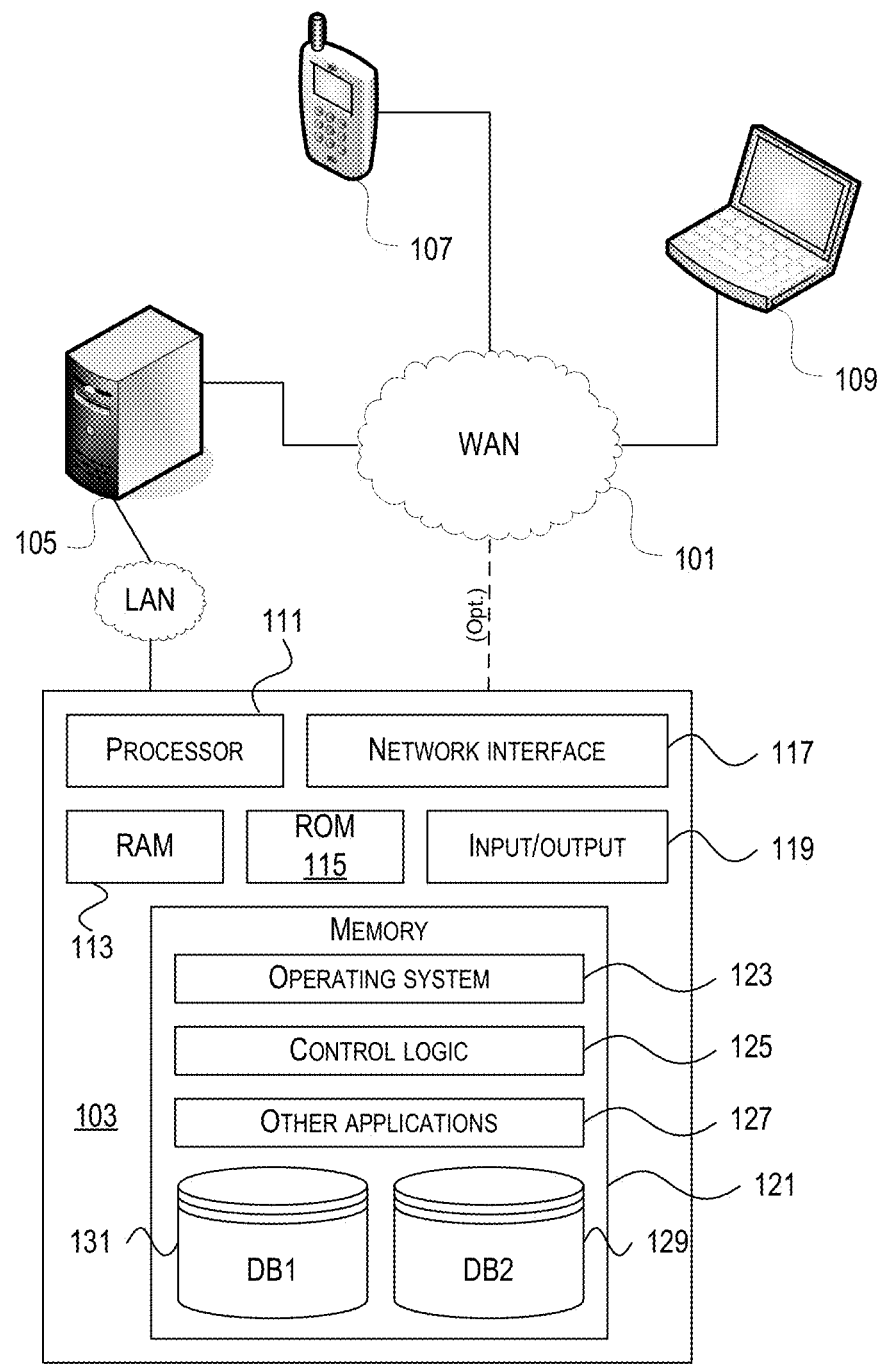
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a contextual zoom feature that permits a user to zoom in on an area of interest within an application or desktop, and for a period of time long enough to complete the touch interaction. The area zoomed might be a group of controls on a ribbon bar, the minimize/maximize/close buttons in the top-right corner of a window, a group of form input controls, or any other natural cluster of related user interface (UI) elements. In contextual zooming, the size of the area zoomed and/or the zoom factor applied are calculated to allow a user to complete their task without overly obscuring the rest of the application/desktop. In some embodiments a bound based contextual zoom feature may be used, for example, in lieu of contextual zooming without bound based functionality, when the context of an application/desktop is unknown or unavailable. In such an embodiment, the zoomed area may be defined by the area designated by the user's gesture on a touchscreen rather than being calculated by the system. Moreover, the zoomed area may be contextually smart in that unlike a simple magnifier control feature where the contents are indiscriminately zoomed for display, the bound based contextual zoom feature may discriminately zoom portions of the bound area of interest based upon, for example, groups or clusters of user interface (UI) elements that are clickable/selectable by the user. Numerous other examples of contextual zoom are described below. Nevertheless, in some examples, when the context information is truly unknown/unavailable, the bound based contextual zooming may identify the bound area of interest defined by the user's gesture and indiscriminately expand it by a zoom factor.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. In some examples, the web server 105 and/or data server 103 may be referred to as a resource server (or content resource server) because they provide content in response to an appropriately formatted request (e.g., a HTTP request). Client computers 107, 109 may be used in concert with data server 103 to access data stored therein, or may be used for other purposes. For example, from client device 107 a user may access resource/web server 105 using an Internet browser, as is known in the art, or by executing a software application that communicates with a resource server (e.g., web server 105 and/or data server 103) over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
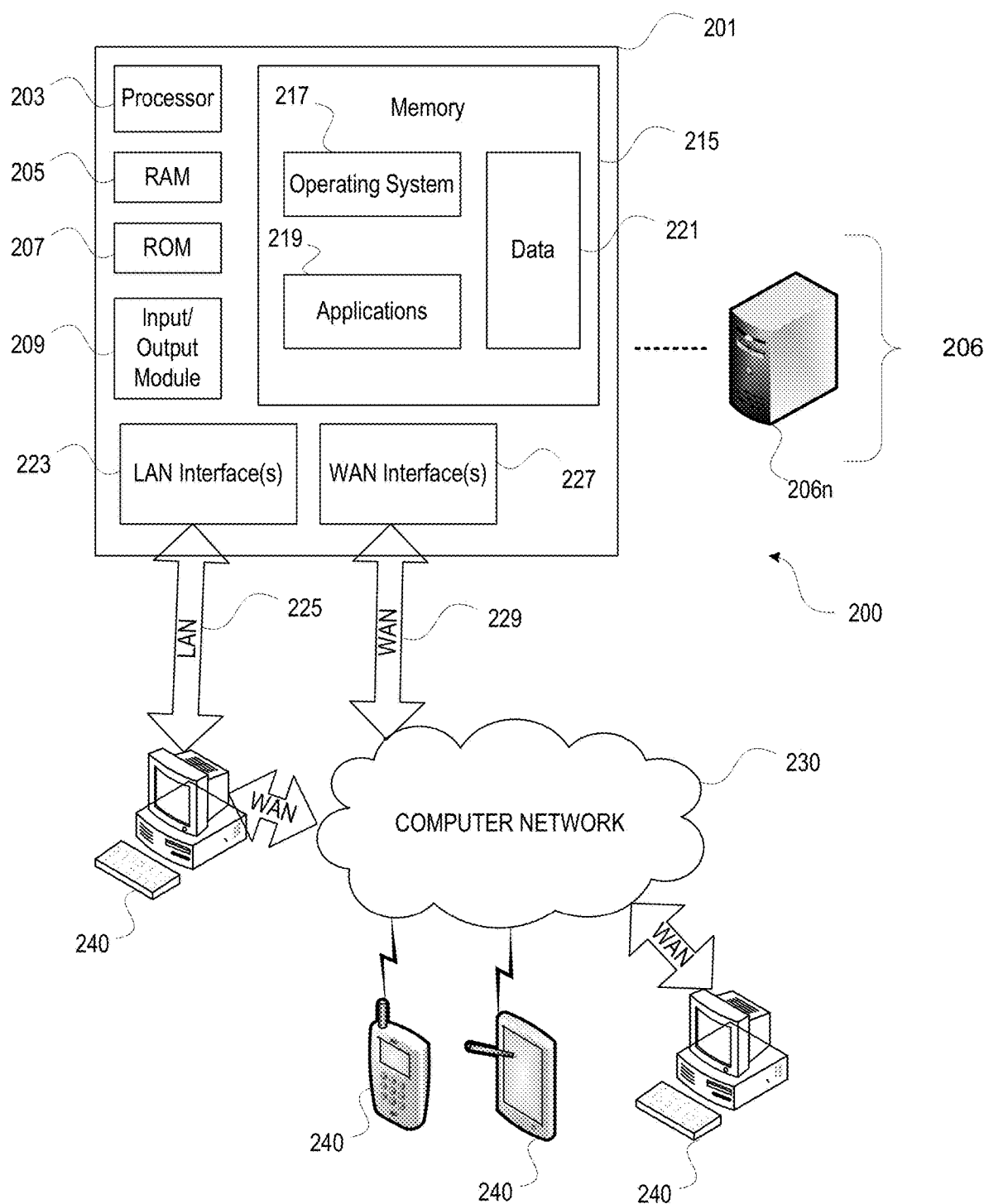
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. Alternatively, generic computing device 201 may, in some examples, be referred to as a user computing device (e.g., computing device 201, terminals 240, mobile terminals/devices, mobile phones, smartphones, PDAs, tablets, notebooks/laptops, personal computers, and others). The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206*a*-206*n* (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol or HDX protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206*a*-206*n* such that the servers 206*a*-206*n* are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206*a*-206*n* within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106*a* that receives requests from a client machine 240, forwards the request to a second server 106*b*, and responds to the request generated by the client machine 240 with a response from the second server 106*b*. First server 106*a* may acquire an enumeration of applications available to the client machine 240 and well as address information associated with an application server 206 hosting an application identified within the enumeration of applications. First server 106*a* can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
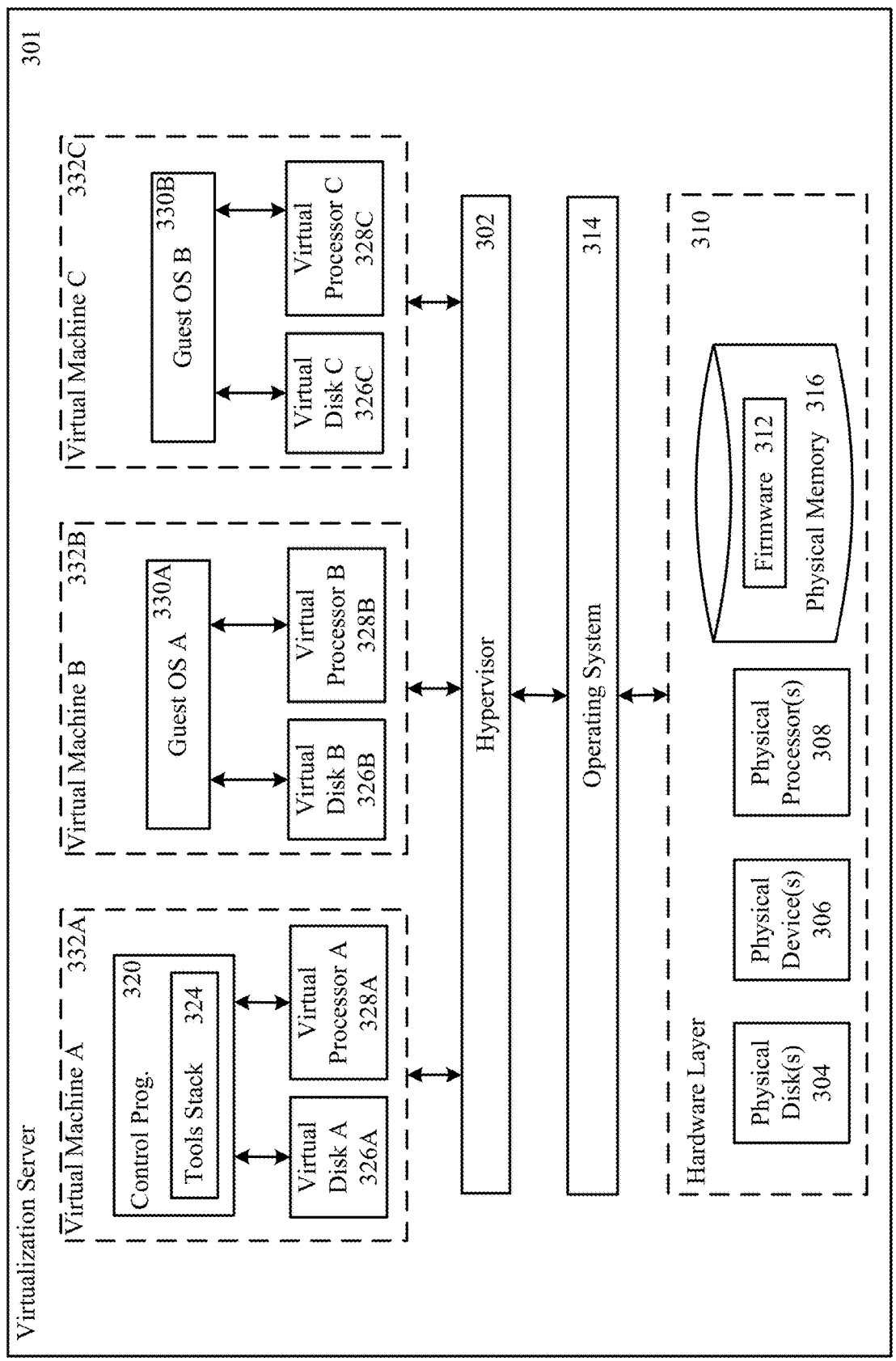
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, DomO, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
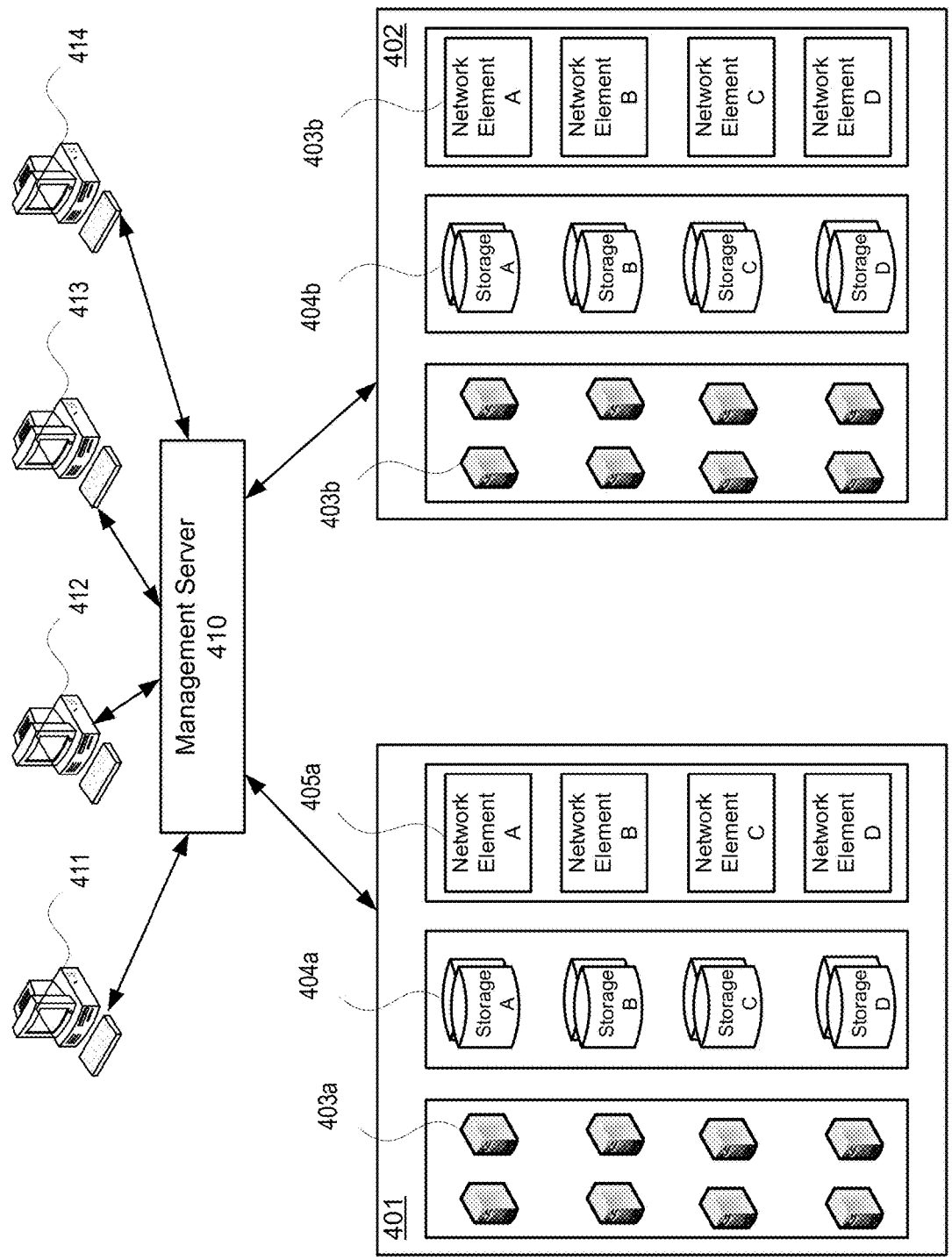
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture.

Figure 5:
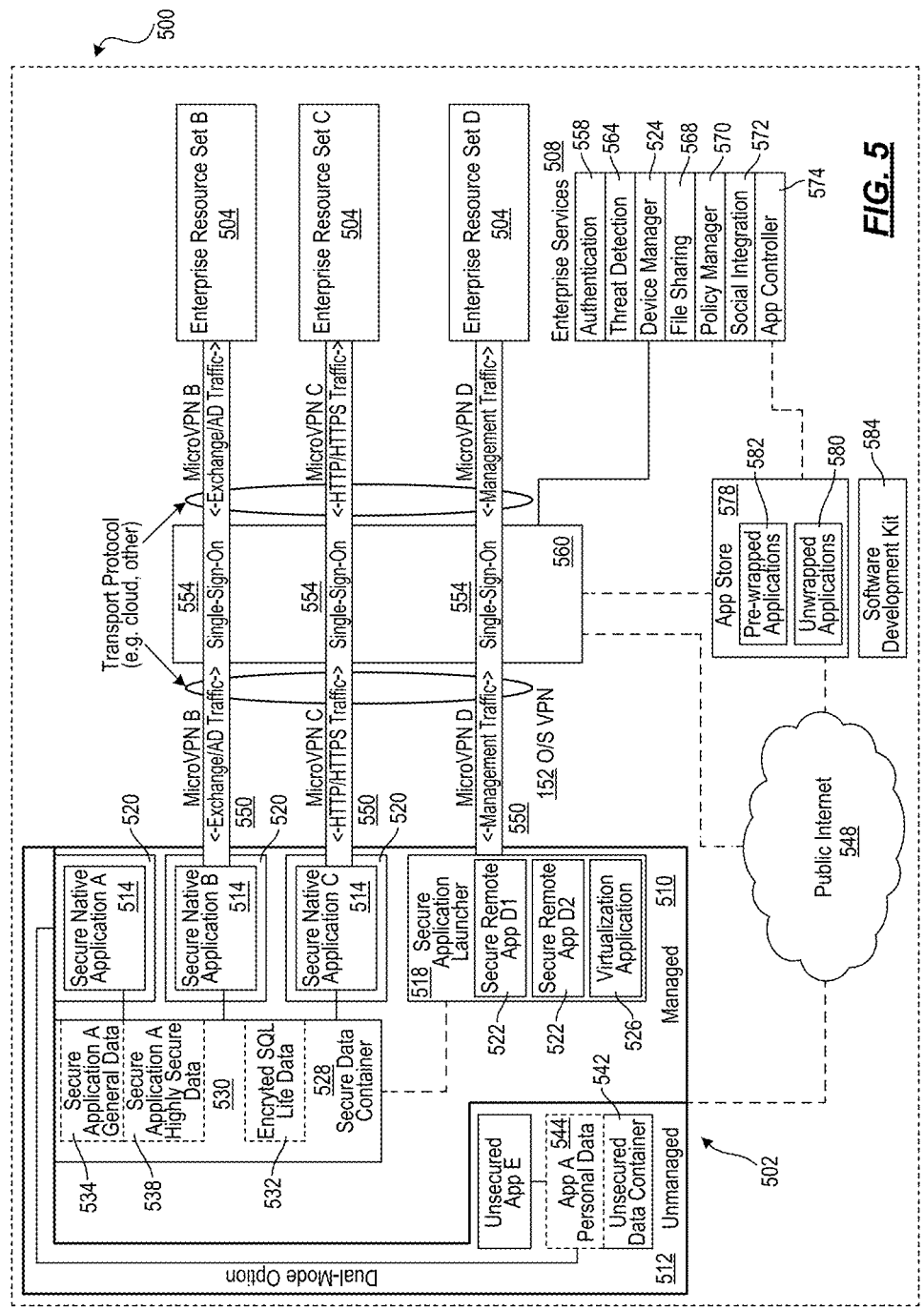
FIG. 5 depicts an illustrative enterprise mobility management system that may be used in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
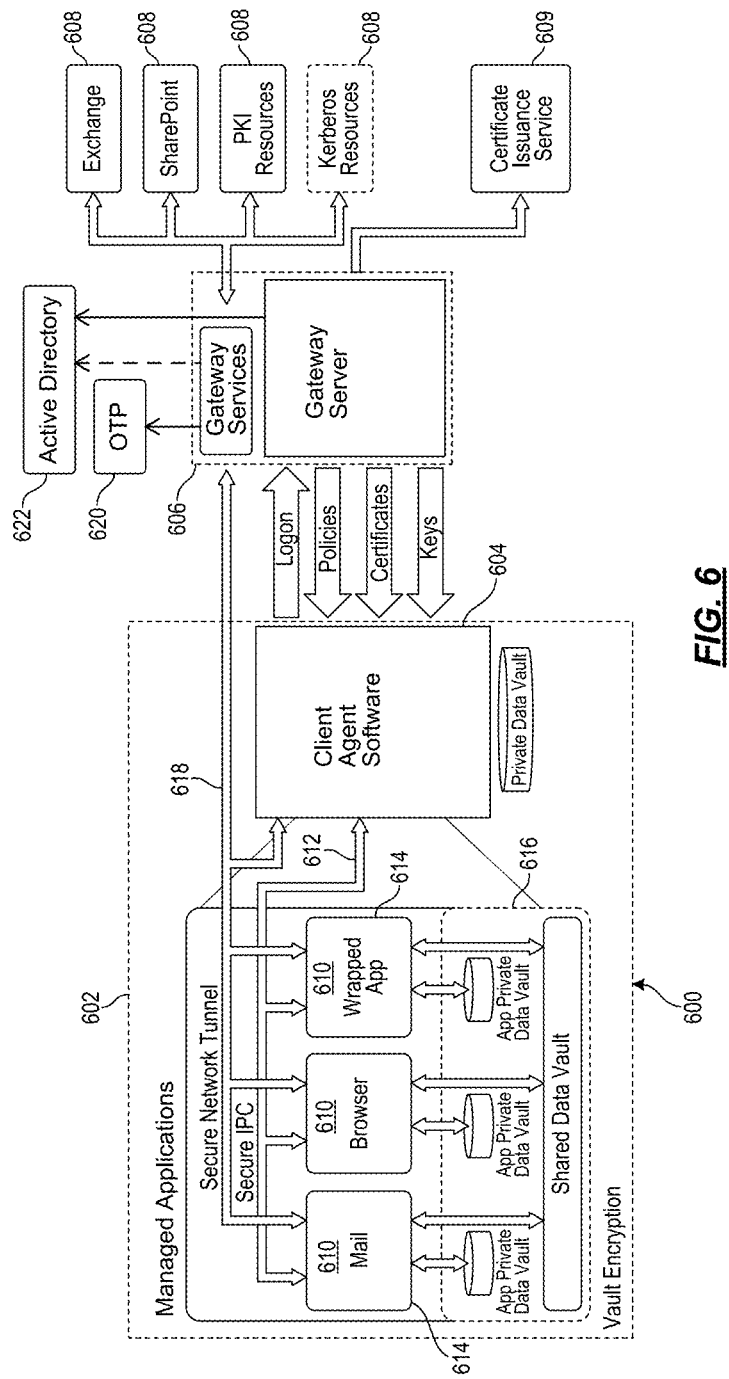
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and App Controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol (i.e., remote presentation protocol). The client agent 604 also supports the installation and management of native applications on the mobile device 602, such as native iOS or Android applications. For example, the managed applications 610 (mail, browser, wrapped application) shown in the figure above are all native applications that execute locally on the device. The client agent 604 and MDX (mobile experience technology) of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the MDX managed applications 610 on the mobile device 602.

The Secure IPC links 612 between the native applications 610 and client agent 604 represent a management channel, which allows client agent to supply policies to be enforced by the MDX framework 614 "wrapping" each application. The IPC channel 612 also allows client agent 604 to supply credential and authentication information that enables connectivity and SSO to enterprise resources 608. Finally the IPC channel 612 allows the MDX framework 614 to invoke user interface functions implemented by client agent 604, such as online and offline authentication.

Communications between the client agent 604 and gateway server 606 are essentially an extension of the management channel from the MDX framework 614 wrapping each native managed application 610. The MDX framework 614 requests policy information from a client agent 604, which in turn requests it from gateway server 606. The MDX framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the MDX Framework 614 "wraps" each managed application 610. This may be incorporated via an explicit build step, or via a post-build processing step. The MDX Framework 614 may "pair" with client agent 604 on first launch of an application 610 to initialize the Secure IPC channel and obtain the policy for that application. The MDX Framework 614 may enforce relevant portions of the policy that apply locally, such as the client agent 604 login dependencies and some of the containment policies that restrict how local OS services may be used, or how they may interact with the application 610.

The MDX Framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The MDX Framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known.

Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the MDX framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the MDX micro VPN feature). For example, an application such as @WorkMail may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the MDX Framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the MDX Framework to mediate https requests).

MDX client certificate support on iOS may rely on importing a PKCS 12 BLOB (Binary Large Object) into the iOS keychain in each managed application for each period of use. MDX client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Bound Based Contextual Zoom.

Figure 9A:
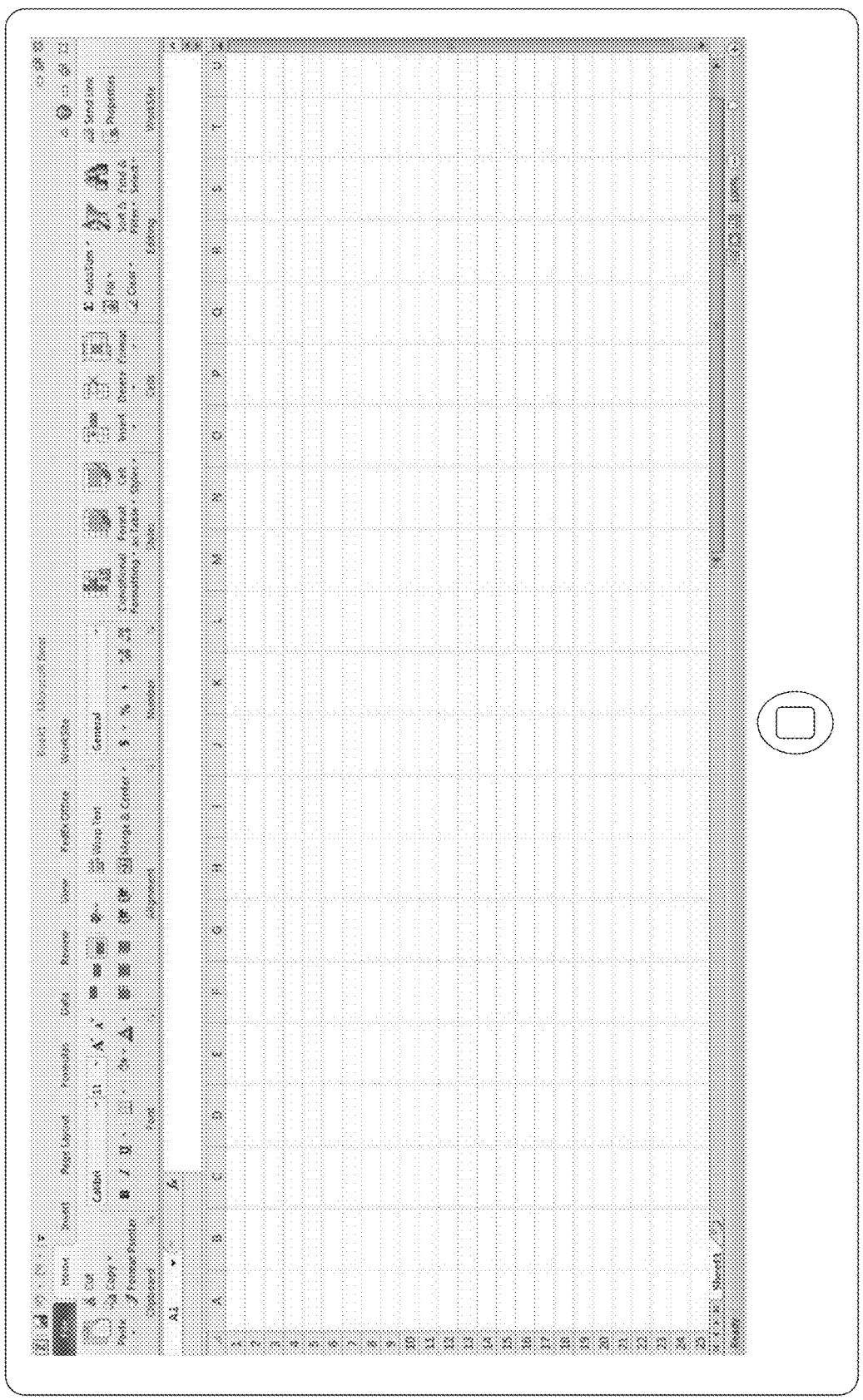
Figure 10A:
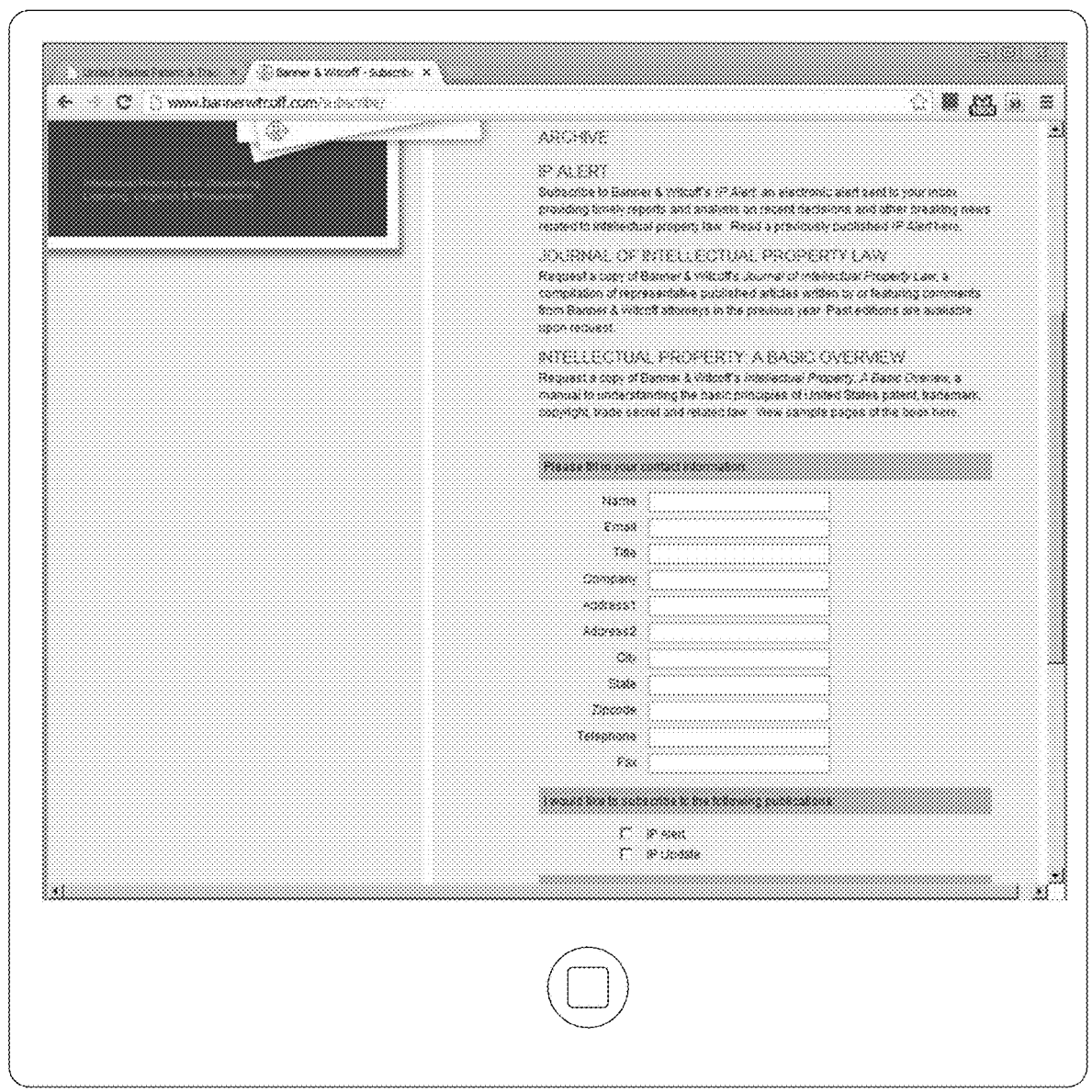
FIGS. 10A and 10B are illustrative before-and-after screen displays of a second contextual zoom overlay in accordance with one or more illustrative aspects described herein.
Figure 10B:
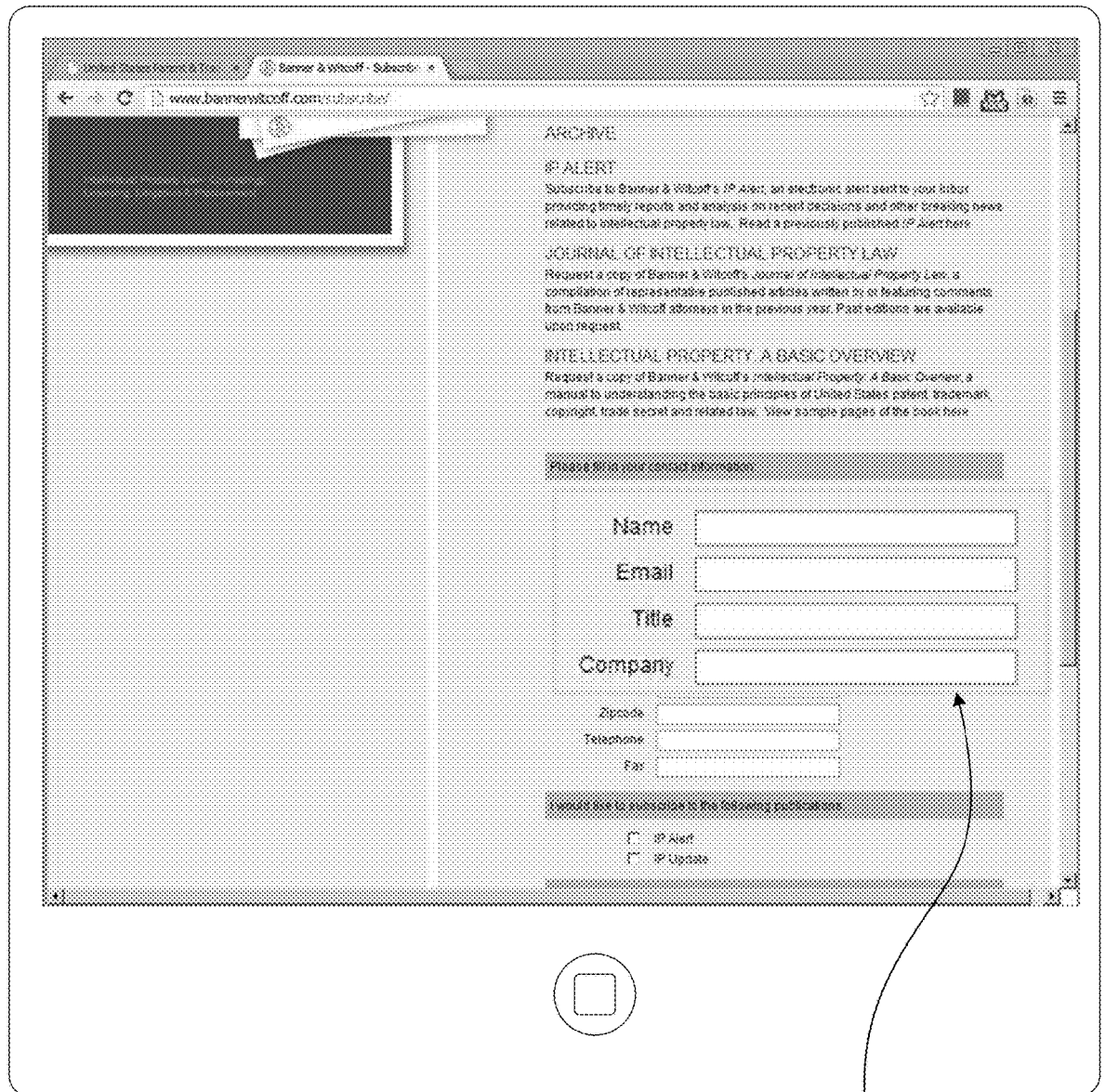

At a high level, contextual zoom relates to the concept that a user may be interested in zooming in on an area of interest within an application or desktop, and only for a period of time long enough to complete the touch interaction. In many cases, the area zoomed may be small and interaction time may be short. The area zoomed might be a group of controls on a ribbon bar (e.g., as illustrated in FIG. 9B), the minimize/maximize/close buttons in the top-right corner of a window, a group of form input controls (e.g., as illustrated in FIG. 10B), a message dialog with an OK button, a group of hyperlinks or controls in a web browser document, or any other natural cluster of related user interface (UI) elements. The size of the area zoomed and the zoom factor applied are calculated to allow a user to complete their task without overly obscuring the rest of the application/desktop. FIG. 9B illustrates contextual zoom on the "font" ribbon bar group 902 in Microsoft EXCEL, while FIG. 9A illustrates the screen 900 with the font ribbon bar group before the contextual zoom overlay was created and displayed.

The aforementioned contextual zoom is different from existing "pan and zoom" and magnifier controls in that the area zoomed, the zoom factor, and when to revert from zooming are each calculated by the system based on the context of the application/desktop, device, and/or user behavior. In some examples, the user need not drag or pan the zoom window around, adjust its dimensions, and/or adjust its zoom factor. The user may quickly activate the contextual zoom of their area of interest, have it positioned automatically by the system, perform touch interaction, and in some cases automatically revert from contextual zoom mode back to regular mode when the user task is complete. Alternatively, in some examples involving bound based contextual zooming, contextual information may be omitted or deficient, thus the system may rely on the bounded area of interest identified by the user gesture activating the bound based contextual zoom and use particular zoom metrics, such as zoomed area and zoom factor, to display a zoomed overlay of the bound area of interest. In examples of bound based contextual zooming where contextual information is at least partially available/provided, the system may incorporate one or more aspects of contextual zooming into the calculation and display of the zoomed overlay area. The use of "bound based contextual zooming" herein includes reference to those examples of zooming where contextual information is available as well as those where contextual information might not be available.

After review of the entirety disclosed herein, it will be clear that contextual zooming and bound based contextual zooming can work independently from one another or in conjunction, based on the capabilities and circumstances of the client agent, server agent, and/or hosted applications. In some examples, a user preference setting may indicate whether to enable one or both, based on a user- or administrator-specified preference. In some examples, if contextual zoom is not appropriate given the circumstances, the system may switch to using bound based zooming (e.g., bound based contextual zooming) automatically. Some example of such scenarios may include, but are not limited to where a virtualized hosted application (e.g., some ADOBE™ applications and GOOGLE™ Chrome) does not utilize the Accessibility, Windows Automation, or other related software development kits (SDKs), thus implying that the context of user interface (UI) controls within the application might not be obtainable. Another illustrative scenario might be in those configurations where a server agent at a virtualization server is involved in contextual zooming, if the communication link between the client agent and server agent has a high latency (e.g., large round-trip packet time), then bound based contextual zooming may be temporarily activated to allow the client agent to obviate communication with the server agent. Another scenario may be for purposes of retro-compatibility (e.g., when a client agent outfitted with bound based contextual zooming is connected to a legacy server agent without such capabilities.)

Figure 11A:
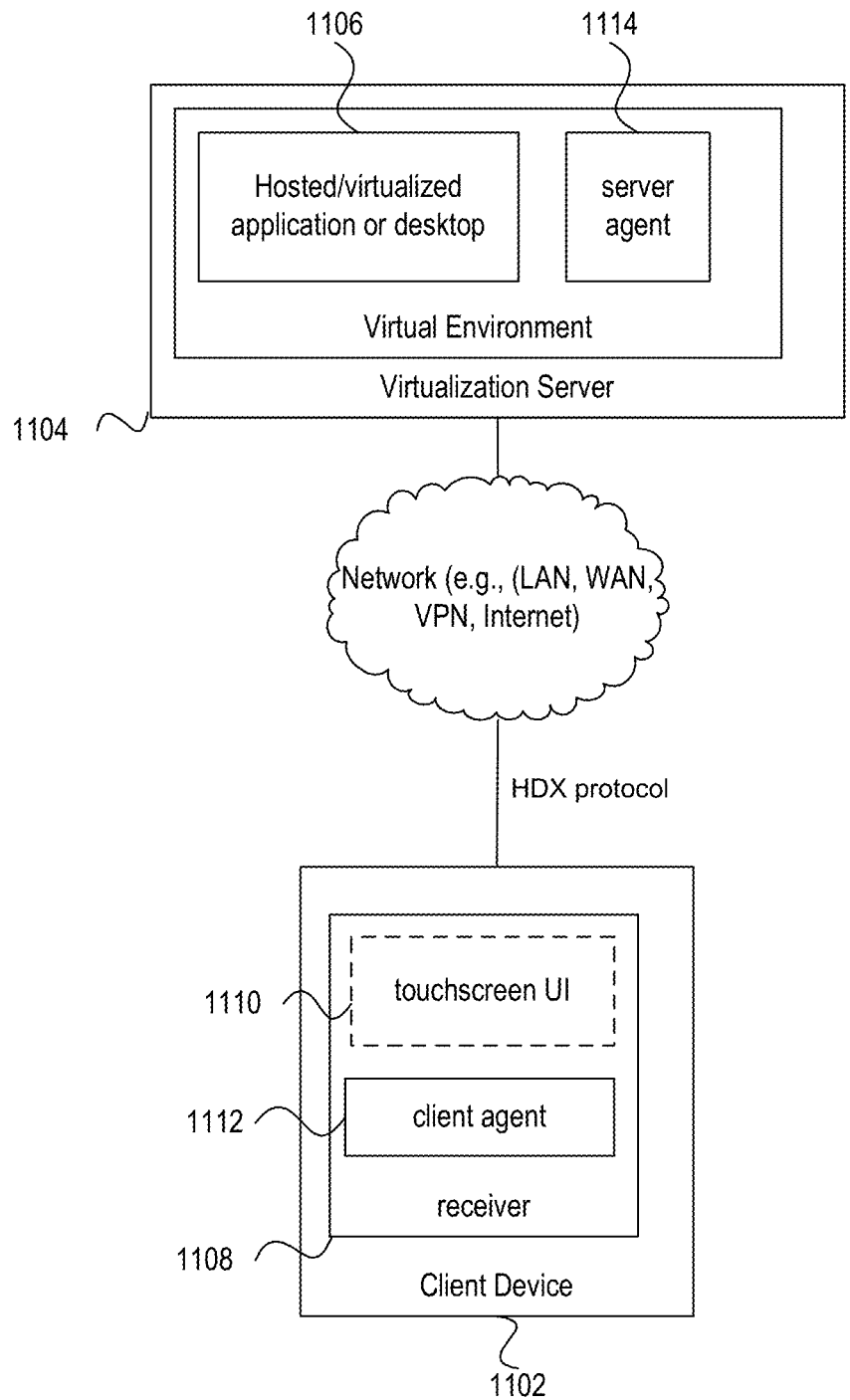
FIG. 11A is a desktop and application virtualization system diagram illustrating various components and modules interacting in accordance with one or more illustrative aspects described herein.

At a high level, the contextual zoom system involves a user device 1102 with a user interface (e.g., a touchscreen user interface 1110, such as with an APPLE iPHONE smartphone), a client agent 1112, a server agent 1114 (e.g., a desktop/application virtualization system such as CITRIX XenApp), and an application/desktop 1106 developed without regard for display/input on a small form factor display (e.g., a legacy application). For purposes of this disclosure, "client" refers to a client agent program 1112. Furthermore, "server" (or "server agent") includes an application or desktop virtualization system, such as CITRIX XenDesktop or XenApp, capable of running hosted applications (e.g., legacy applications 1106). The client and server, as illustrated in FIG. 11A, may communicate through an established protocol (e.g., the HDX/ICA protocol in the case of CITRIX XenDesktop/XenApp). The disclosure, however, is not so limited to particular platforms. The various features of this disclosure apply to other competing desktop and application virtualization platforms such as MICROSOFT's Remote Desktop Services (RDS with RDP protocol), CITRIX GoToMyPC, VMware View (with the PC-over-IP protocol), Virtual Network Computing (VNC), TeamViewer and LogMeIn.

Figure 11B:
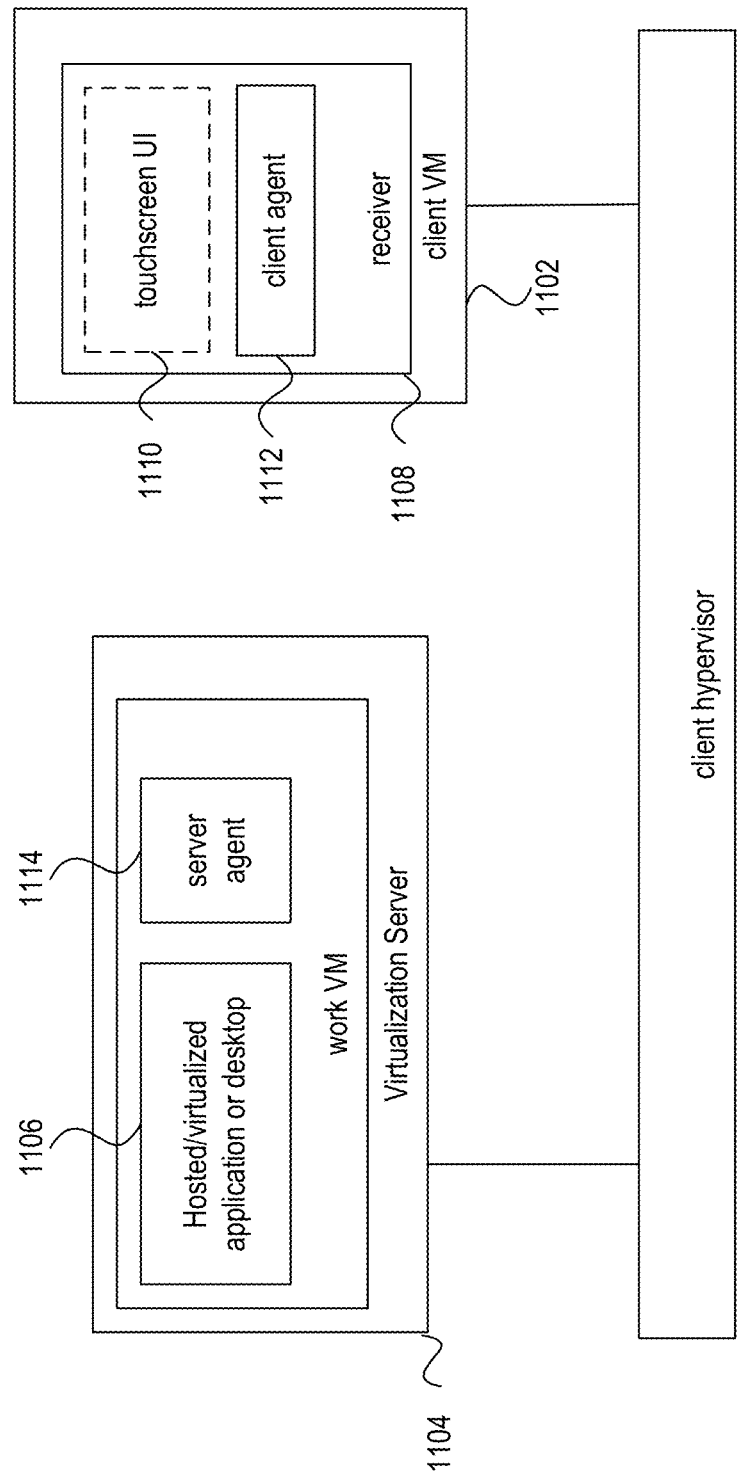
FIG. 11B is a client virtualization system diagram illustrating various components and modules interacting in accordance with one or more illustrative aspects described herein.

In addition, the disclosure contemplates an operating environment involving client virtualization platforms, such as Citrix XenClient, where the applications are securely hosted in a work virtual machine (VM) and remoted to the user VM on the same device, as illustrated in FIG. 11B and FIG. 3. Such a configuration/model is similar to the above desktop and application virtualization system, except that the communication channel may be local to the computing device or computer, instead of using a network. Communication could be via a hypervisor (such as shared memory) or some other inter-VM communication mechanism.

Figure 11C:
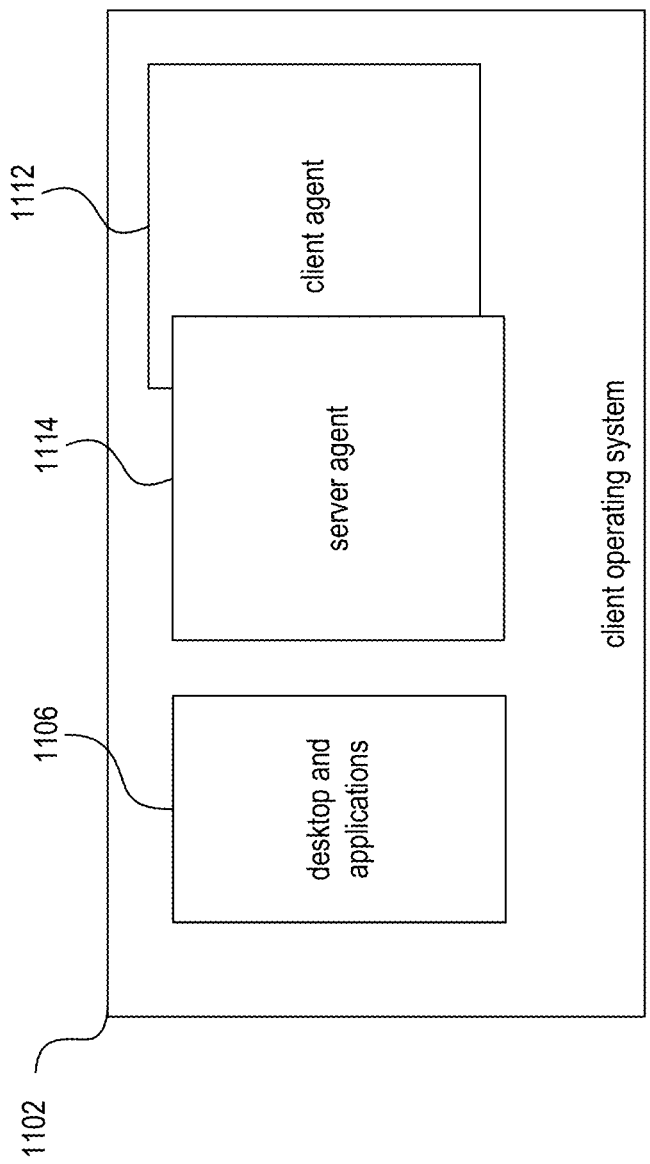
FIG. 11C is a non-virtualized (i.e., bare metal) system diagram illustrating various components and modules interacting in accordance with one or more illustrative aspects described herein.

Referring to FIG. 11C, the disclosure also contemplates an operating environment in a non-virtualized (or bare metal) platforms, such as Windows 8 or Windows RT running on tablet devices. In such embodiments, the client 1112 and server 1114 functions may be combined and run as a service within the operating system (OS). In each of the system configurations illustrated in FIGS. 11A, 11B, and 11C, all application delivery models are supported—i.e., applications can be installed (e.g., MSI, EXE, or install script), streamed (e.g., MICROSOFT App-V), virtual machine (VM) hosted, or a web application hosted in a browser.

Figure 7:
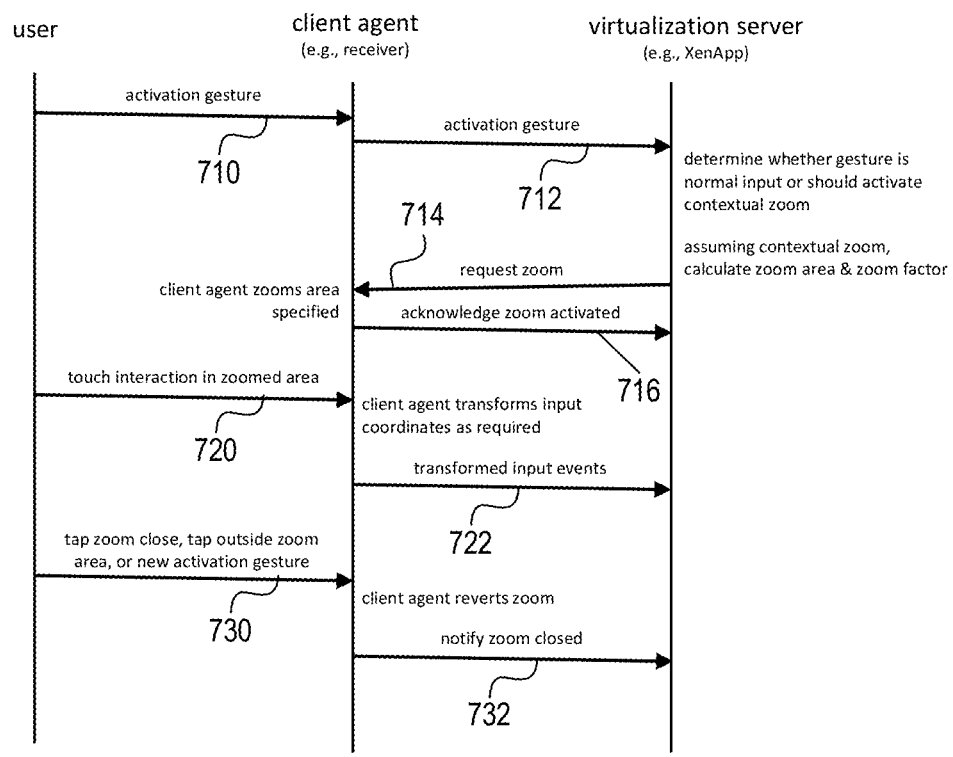
FIG. 7 depicts an interaction diagram of components in a virtualized system in accordance with one or more illustrative aspects described herein.
Figure 8:
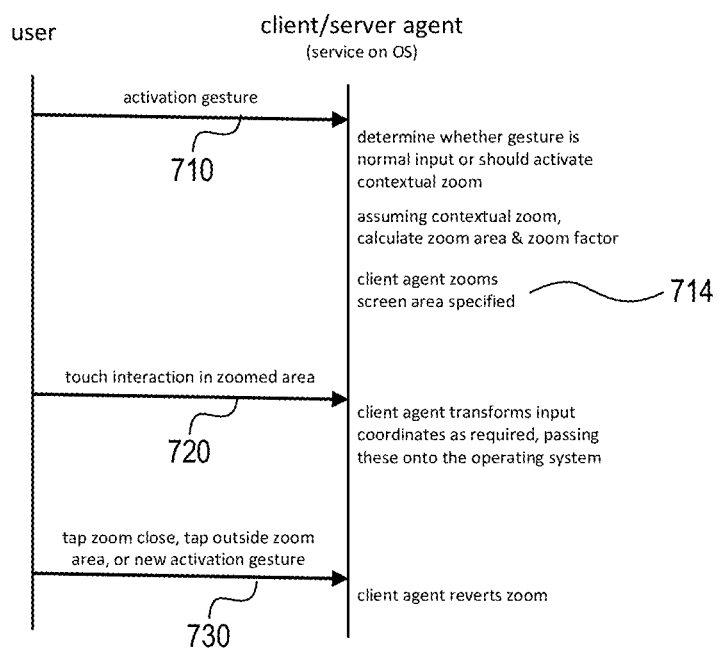
FIG. 8 depicts an interaction diagram of components in a non-virtualized (i.e., bare metal) system in accordance with one or more illustrative aspects described herein.

Referring to the illustrative system configuration of FIG. 11A, the interaction flow diagram of FIG. 7 illustrates various steps performed by the user, client, and/or server illustrated in FIG. 11A to generate a contextual zoom overlay in accordance with various aspects of the disclosure. Meanwhile, with respect to the system configuration of FIG. 11C, which illustrates a non-virtualized (or bare metal) system deployment in which the client and server are essentially merged/combined into a single service running on the operating system, the interaction flow diagram of FIG. 8 illustrates various steps performed by the user and combined client/server to generate a contextual zoom overlay in accordance with various aspects of the disclosure. Each of the steps illustrated in the interaction flow diagrams of FIGS. 7 and 8 are described in turn below. In addition, numerous variations on the aforementioned illustrated flows are contemplated by this disclosure and some are described below.

At a high level, the contextual zoom system comprises the general stages of activation, zoom, interaction, and/or close. In the activation stage, a user may apply a predetermined gesture over, or in the vicinity of, the area of interest on the touchscreen. In the zoom stage, the area of interest within the application or desktop may be zoomed and displayed on an overlay. In the interaction stage, the user may interact in the zoomed overlay area with clickable elements, which as a function of the zoomed overlay are displayed larger than previously display in order to foster easier user interaction.

Finally, in the close stage, the contextual zoom overlay may be closed, inter alia, by a user, thus reverting the zoomed area back to normal size. Each of the aforementioned stages is described in detail below.

Regarding the activation stage, a user of a touchscreen device may perform a predetermined gesture (step 710) to activate/trigger a request for contextual zooming (e.g., bound based contextual zooming). The gesture may be a simple finger swipe, two finger tap, or indeed any other gesture that does not interfere with the gestures already in use by client or server for some other purpose. In some examples, a swipe gesture may be used because of the added benefit in that the user can draw a series of points, instead of a single point, to better indicate what area they are interested in zooming into. For example, a tap between a menu and tool bar might be ambiguous as to whether the user wishes to zoom the menu bar or the tool bar. Whereas a swipe down through the tool bar might better indicate that the user wishes to contextually zoom the tool bar instead of the menu. A swipe also provides some indication of how large the area of interest is. A long swipe through a form might indicate that the area of interest to contextually zoom is the whole form, instead of just a few input fields. In another example, a predetermined user gesture may activate a request for bound based contextual zooming. The user gesture may comprise a diagonal swipe from one corner of a rectangular/square bound area of interest on a touchscreen user interface (UI) to an opposite, far corner of the bound area of interest. In another example, the predetermined user gesture that activates a request for bound based contextual zooming may be defined, without a user swipe, by a first point and a second point on the touchscreen at opposite corners of a rectangle defining the bound area of interest. Since a user swipe is frequently used for scrolling and may sometimes be difficult to overload for zooming purposes, the aforementioned user gesture may include a two-finger tap gesture where each finger contacts the first point or second point defining the opposite corner of a rectangle. For example, the corners specified by the user gesture may be bottom-left and top-right (typical for right-handed users) or top-left and bottom-right (typical for left-handed users). The aforementioned user gesture is different from a pinch gesture that activates a "pan-and-zoom" feature, as discussed above, in that only a portion of the entire application/desktop is zoomed. Moreover, use of the aforementioned user gestures to activate bound based contextual zooming does not limit a user's ability to also use pan-and-zoom when desired on the user computing device.

The bound area may form a rectangle, square, or any other shape (e.g., circle, oval, or other free-form shape) that may serve as coordinates corresponding to a desired zoom area. In various examples, the aforementioned diagonal swipe may require two fingers of the user be positioned side-by-side together for the swipe (i.e., a two-finger swipe) to activate the request for contextual zooming. In yet another example, the aforementioned diagonal swipe may require one finger, two fingers, or more fingers positioned in a predefined arrangement with respect to each other on the touchscreen interface to trigger a request for bound based contextual zooming.

Moreover, in some examples, swipe gestures may also be initiated from the bevel of a user client device onto the application or desktop surface for, inter alia, the purpose of allowing easy selection of controls near the edge of screen surface. For example, many Windows applications when maximized have minimize, restore, and close buttons clustered in the top-right corner. Similarly, the method also supports swipe gestures directed from within the application or desktop surface outwards onto the bevel. In some examples, particular swipe gestures (or other gestures) may be reserved by the operating system (OS) for a designated use. One such exception is in the WINDOWS 8/RT operating system in which the aforementioned swipe gesture is reserved by the operating system for activating app menu bars, charm bars, and task switching.

Depending on the bound based contextual zoom system configuration (e.g., FIG. 11A), in some embodiments, the activation request may be forwarded (step 712) by a client agent 1112 to a server agent 1114 at a virtualization server 1104. The system may determine whether the input gesture from the user is for normal user input or a request to activate a contextual zoom overlay. In some examples, the determination may occur at the server agent at the virtualization server 1104. In other examples, the determination may occur at the client agent. At least one benefit of the determination occurring at the client agent is that network bandwidth and latency may be more efficient. Of course, in a bound based contextual zoom system configuration like in FIG. 11C, the client agent and the server agent may be combined/merged, thus the benefit of different locations for the determination step may be moot.

In the zoom stage, the bound based contextual zoom system may perform computations/calculations to determine at least a zoom factor for the contextual zoom overlay. For example, for a bound based contextual zoom feature, a first point and second point on a touchscreen designated by a user's activation gesture define the bound area of interest. With the point, or array of points, captured by the client and made available to the server agent (or the client agent, in some embodiments), the bound zoom area of interest and zoom factor may be calculated. In some embodiments, the calculations may occur at a server agent located on a virtualization server, a client agent located on a user computing device, or a combination of the aforementioned two (e.g., distributed responsibility for one or more parts of the calculations). When context information is available, the calculations may be based on what groups or clusters of elements are found, whether the elements are clickable and would respond to mouse or touch input, the rendered size of these elements on the device, device screen size, device screen pixel density (commonly measured in DPI/dots-per-inch or PPI/pixels-per-inch), and/or current device orientation (portrait or landscape). For instance, on a small device with high DPI (such as an APPLE iPhone) the zoom area may be small enough to fit the width of the screen but indicate a high zoom factor to ensure clickable elements are displayed large enough to touch. On a larger display device such as an APPLE iPad, the zoom area may be larger with a smaller zoom factor. Likewise, orientating the device in landscape may allow for a wider zoom area than in portrait. For obvious reasons, the maximum dimensions of the contextual zoom overlay may be limited to a maximum dimension of the client's actual display screen, thus avoiding a situation where the scaled image on the overlay would be truncated/hidden.

In addition, the grouping or clustering of elements is factored into the aforementioned calculations. For instance, contextually zooming a group of buttons on the ribbon bar (e.g., see FIG. 9B) may require minimal calculations because the containment of elements may be well defined by the ribbon bar group element. Other elements groupings, however, may be less well defined. A collection of HTML input fields, links, and buttons displayed in a web browser may be grouped by the document window, but might be scattered and spaced widely apart. As the elements are too far apart to zoom collectively, the system may determine the area of interest and contextually zoom individual elements or clusters of elements in that area. Statistical techniques and heuristics may be used to best determine the boundaries of these elements clusters. In one example, clustering may be primarily based on the proximity of elements to each other. In other examples, clustering may be based on other attributes such as element alignment, elements of a common type, keyboard tab order, element styling, and/or button dimensions. In the case of bound based contextual zooming, the user activation gesture may define the bound area of interest, but the user interface (UI) elements/controls located inside the bound area of interest may be determined and zoomed (or otherwise manipulated) to take advantage of a contextual zooming feature. Meanwhile, if contextual information is not available for some reason, the bound based contextual zoom feature may simply zoom by a calculated zoom factor the entire bound area of interest.

In an example where contextual information is available, on a web browser form 1000 (see FIG. 10A), a user may activate contextual zoom and cause a contextually zoomed area overlay 1004 to be displayed on the web browser form in FIG. 10B. The contextual zoomed area may include the topmost input fields. The system determined, based on control proximity and alignment, that the contextually zoomed area 1004 encompasses the first four input fields and their labels. This is the element cluster. The other sibling fields, links, and buttons on this web page may be excluded from the zoomed area.

Once the system (e.g., server agent or client agent) has calculated the zoomed area and zoom factor, in some embodiments, a request may be sent (step 714) by the server agent to the client agent to generate the contextual zoom overlay. The zoom metrics (e.g., zoom area, zoom factor, and/or other data) may be passed within this request. The zoom area may be a bounding rectangle (or other shape) in screen coordinates and measured in pixels. Based on the shape of the zoom area, the data corresponding to the zoom area may differ (e.g., for a circle shaped zoom area, the zoom area may include the coordinates of the center of the circle and the length of the radius measured in pixels). In addition, the zoom factor may be a scaling factor ratio relative to original size.

In accordance with various aspects of the disclosure, the scaling factor will have a value greater than 1 and may be a floating point number to represent any fractional scaling factor (e.g., a value of 1.285 means zoom 128.5% of original size.) The scaling factor may be calculated to ensure the dimensions of the elements displayed on the client device are of a minimum physical dimension, measured in device independent units such as millimeters, points, or inches. As different users have different levels of physical dexterity, coordination and eyesight, the preferred minimum element size may be configurable to suit to each user. As such, a stored user preference value may be provided to the client agent to assist in identifying the preferred minimum element size for the user.

In response to receiving the request to activate contextual zooming (e.g., bound based contextual zooming or other contextual zooming) for the area of interest, the client agent may stretch the bitmap/graphic representation from its video buffer, applying a suitable anti-aliasing and/or image interpolation techniques, in some examples, to maintain rendered image quality. The previously calculated zoomed area may be used to identify the area of interest in the image stored in the video buffer. The image corresponding to the area of interest may be stretched and modified as previously described. The stretched image may be overlayed on the application or desktop surface image. Meanwhile, the position of the scaled image may be anchored, in some examples, at its original top-left coordinate on the screen. In situations where there is insufficient screen width or height available to display the scaled image, the image may be pushed leftwards or upwards to ensure it is fully visible. The scaled image may be appropriately positioned to ensure that the complete overlay image is visible and, in some examples, anchored from either top-left or top-right or bottom-left or bottom-right of the original coordinate. Once the contextual zoom overlay is generated and displayed, in a system configuration like FIG. 11A where the client agent and server agent are not combined, the client agent may send (step 716) an acknowledgment to the server agent.

However, if the scaled image is too wide or too high for the client screen size, the contextual zoom flow may be aborted by the client without sending an acknowledgment/confirmation of successful contextual zoom. Since the server (and/or client agent) may, in some examples, pre-calculate the area and zoom factor based on client screen size and orientation to ensure that the zoomed image would fit the client display, a premature aborting by the client may occur infrequently. Nevertheless, if the server (and/or client agent) calculations are based on invalid or "stale" client metrics, such as a change of client device orientation event has not yet been received by the server and thus the server utilized old orientation state data, then such aborting may occur.

If zooming the area of interest, which may comprise group of elements or element cluster, would cause the zoomed area to be too large for the client screen size, heuristics may be applied to reduce the size of the zoomed area. In an example when context information is available, if the user is contextually zooming a long tool bar/menu with many small buttons, reducing the size of the zoomed area may be achieved by reducing the number and scope of elements that make up the cluster, prioritizing elements that are closer to the activation gesture point or points, and/or bound on elements classified as separators (e.g., tool bar separators or menu separators). In another example when context information is available, the size of the zoomed area may be reduced by reducing to a lower element grouping scope; for example, discriminately zoom the action buttons only within a dialog box instead of the whole dialog box. In yet another example, regardless of whether context information is available, the size of the zoomed area may be reduced by reducing the zoom scaling factor, but used sparingly to ensure elements are still large enough to touch. The previous example of reducing the zoom scaling factor may be particularly useful in a bound based zooming scenario where context information might not be available/accessible. One or more of the aforementioned techniques may be used in combination to achieve the desired objective.

In the interaction stage, with the scaled contextual zoom image overlaying and partially obscuring the application or desktop surface, the user may interact (step 720) with the zoomed controls as normal. All forms of touch or gesture input methods that are available in the client when interacting with the application or desktop may be available within the contextual zoomed area. For example, a tap-and-hold gesture on the zoomed overlay area may translate to a right mouse button click, as is typical for activating a context menu. Such a gesture within the zoomed overlay area would result in the same effect as before. The only difference is that the client may perform additional processing to translate/transform (step 722) the touch point coordinates within the zoomed overlay area into normal screen coordinates before, in some examples, sending to the server. In an alternate embodiment, the translation/transformation may be performed at the server location, assuming the appropriate information is available (or sent) to the server to perform such calculations. In yet another embodiment, the translation/transformation may be performed by the client agent and used by the client agent without necessitating communication with a remote server. One such example may involve the bound based contextual zoom feature in particular scenarios.

In the close stage, in some embodiments, the client removes the contextual zoom overlay and notifies (step 732) the server (e.g., server agent) that the contextual zoom mode has been closed. Closing the contextual zoom mode and reverting back to normal operation (step 730) may be achieved in one of numerous different ways. In one example, a user may select an explicit close button displayed over or near the zoom overlay area, and cause the overlay to close. Alternatively, a "pin" button may be provided in lieu of (or in addition to, if appropriate) the close button to prevent the zoom overly area from closing if, for example, the user wishes to perform multiple actions within zoomed areas. In another example, the user may tap elsewhere on the application or desktop surface, thus causing focus to change from the overlay to another portion of the screen and automatically closing the overlay area. In yet another example, the user may re-apply a predetermined gesture for triggering/activating a contextual zoom over a different area on the application or desktop surface. As a result, the existing overlay may be closed and a new contextual zoom overlay may be opened for the new interested area. Finally, in some embodiments a default setting might indicate a preference to keep zoomed overlay areas automatically pinned and provide a close button instead. The default setting may be set by a user/administrator and be specific to a particular user or group of users; alternatively, statistical techniques and/or heuristics may be used to best determine the preferences and automatically set.

In addition to the interaction flows described above and illustrated in FIGS. 7 and 8, this disclosure contemplates numerous variations including, but not limited to features related to auto-activation; auto-switch and auto-expand; auto-close; behavior-based automation; manual expand; and multiple activations. Each embodiment is described in turn below.

Auto-Activation Feature.

Regarding the auto-activation feature, in those examples when context information is available, the server (e.g., server agent) may make a determination that contextual zoom be activated without a user explicitly requesting it, thus saving the user from making the activation gesture. The server (e.g., server agent) may make such a determination when the next user interaction is predictable within a fixed area and essentially mandates a modal response from the user. For example, auto-activation may be implemented in a situation where a menu with a short list of menu items is displayed as the result of some user action; the server (e.g., server agent) may trigger an automatic zoom of the menu. In another example, auto-activation may be implemented in a situation where a combo box control with a small list of items is displayed; the server may trigger an automatic zoom of the list. In yet another example, auto-activation may be implemented in a situation where a modal message dialog is opened; the server (e.g., server agent) may trigger an automatic zoom of the cluster of action buttons or the whole dialog box. Although the auto-activation feature may not be readily applicable to various embodiments of a bound based contextual zoom feature, a contextual zoom system is contemplated herein where a bound based contextual zoom feature and other types of contextual zoom features co-exist.

Auto-Switch and Auto-Expand Feature.

Regarding the auto-switch or auto-expand feature, the server (e.g., server agent) makes a determination that the active contextual zoom overlay be automatically switched elsewhere and/or expanded based on some change in the user interface (UI). The server (e.g., server agent) may make such a determination when the user's attention and input is required elsewhere on the screen. For example, auto-switch or auto-expand may be implemented when a user taps a menu item to reveal a sub-menu while zoomed in on the menu; the zoomed area can either switch over to the sub-menu or be expanded to encompass both the original menu and sub-menu. In another example, auto-switch or auto-expand may be implemented when a modal message dialog box is opened while already zoomed elsewhere; this zoomed area may move automatically to the dialog box or cluster of action buttons. In yet another example, auto-switch or auto-expand may be implemented when a context menu is activated by the user while zoomed elsewhere. Additionally, in another example, auto-switch or auto-expand may be implemented when a combo box control is displayed while zoomed elsewhere. In yet another example, auto-switch or auto-expand may be implemented when the user moves or resizes the window containing the zoomed area. Further changes in the UI may trigger additional auto-switching events. Upon the user completing the interaction within the switched and/or expanded zoomed overlay area (e.g., after a menu item click), the previous zoomed overlay may be restored, in some embodiments. This reversion process may continue recursively down the stack of auto-switch/auto-expand events as necessary. Although the auto-switch, auto-expand features may not be readily applicable to various embodiments of a bound based contextual zoom feature, a contextual zoom system is contemplated herein where a bound based contextual zoom feature and other types of contextual zoom features co-exist.

Auto-Close Feature.

Regarding the auto-close feature, this feature is akin to auto-activation except it handles automatically closing the contextual zoom overlay/mode. The auto-close feature preempts or predicts that zooming is no longer required, thus saving the user from having to manually close a contextual zoom overlay. The amount of time before auto-closing a zoomed overlay may be based on fixed rules and/or heuristics about the types of elements, how element state changes, and how certain types of elements are typically used. In one example, if the underlying collection of zoomed elements are destroyed or hidden, then an auto-close of the zoomed overlay may be appropriate; for example, the user taps a button on a dialog box causing it to close, or an item from a menu causing the menu to close. In another example, if the user is statistically unlikely to have further interaction with the controls that are zoomed after some initial interaction, then an auto-close may be appropriate. For example, with tool bars and ribbon bars, a user typically makes a single button click or combo list selection before interacting elsewhere within the application. A counter-example of when not to auto-close may be when the user taps to begin editing some text in a text box; the user will likely continue interacting with elements in the form that contains the text box.

Behavior-Based Automation Feature.

Regarding the behavior-based automation feature, improved automation may be achieved using statistical and probabilistic methods to make predictions about user behavior based on past observations and outcomes. The aforementioned automation techniques are based on either hard-coded or configurable rules; any heuristics applied by the system are essentially coded in. Some examples of behavior-based automation include, but are not limited to: (1) a user is observed to repeatedly activate contextual zoom on a logon form for a particular application on startup; the server "learns" this behavior and proceeds to auto-activate contextual zoom on this particular form in future; and (2) a user is observed to repeatedly re-activate contextual zoom on the same element cluster immediately after zoom was auto-closed; the system adapts to this behavior by refraining from auto-closing these controls again in future. In some examples, data collected about user behavior may be persisted and used for future sessions and analysis. Data may be correlated and used between different users and devices.

Manual Expand Feature.

Regarding the manual expand feature, this feature allows a user to expand the area of interest while already zoomed. In one example, the user may swipe from within the zoomed area outwards in any direction to expand the bounds of the zoomed area, taking in other nearby groups or clusters of elements. For example, the user is zoomed on a collection of input fields in a form but wishes to interact with other fields on the same form. In another example involving the bound based contextual zoom feature, the user may manually expand the bounds of the area of interest using the manual expand feature described herein.

Multiple Activations Feature.

Regarding the multiple activations feature, this feature allows a user to have multiple disjoint areas of the screen contextually zoomed at once, assuming sufficient application/desktop surface remains for multiple, concurrent zoomed overlays. In one example, if a user applies a gesture to activate a second area of interest, instead of closing the previous activation, the system would create and display an additional zoomed overlay area. Whether to have one or more zoomed areas active at one time may be dependent on user preference and/or based on a contextual determination. For example, the additional area of interest to be zoomed may be within the same form as other controls already zoomed. Zoomed overlay areas may be closed individually, closed collectively, and/or auto-closed using methods already described herein. In an example involving the bound based contextual zoom feature, the user may have multiple disjoint areas of the screen bound based contextually zoomed at once the multiple activation feature described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. For example, although "touchscreen" is used in numerous examples herein referring to conventional touch-sensitive or heat-sensitive glass/plastic clear displays commonly found on mobile smartphones, tablets, and other user devices with small (e.g., portable) form factors, the use of touchscreen is not so limited. This disclosure also contemplates touchscreen to include user interface that do not necessarily require the user to touch a screen. For example, MICROSFT Kinect, GOOGLE Glass, and other technologies for "touch-less" user interface are contemplated for use in accordance with various aspects of the disclosure. For example, a user's hand (or other body part) may hover over a particular area of interest to trigger the activate stage of the contextual zoom process.

In some of the examples described herein, the methods and systems describe the server obtaining client device context such as screen size, pixel density, and device orientation. Sharing this information may be done through an extension of the HDX protocol either as a separate ICA virtual channel or as an extension to the mobile receiver virtual channel (MRVC), which is part of the CITRIX mobility pack software development kit (SDK). Moreover, obtaining context about controls, elements and groupings can be obtained using the Microsoft Automation API, the Microsoft UI Automation (UTA) framework, the Web Accessibility Initiative Accessible Rich Internet Applications (WAI-ARIA) specification, or older Microsoft Active Accessibility (MSAA) framework. The latter dates back to Windows 95.

In numerous examples, double or multiple hop remoting of contextual zoom is supported where all the intermediate client agents are capable of passing through relevant protocol data to the end user's client agent. An example is a client agent application connected to a XenDesktop VDA running a client agent connected to a XenApp server hosting a legacy WINDOWS application. Assuming the intermediate client agent is capable of detecting that it is running hosted, it may pass-thru data on without processing it. Alternatively, intermediate client agents may be configured to support as a provider one of the user interface (UI) automation or accessibility frameworks for the desktop or applications they are hosting (further details about this in the Implementation Notes section later in this document.) To implement pass-through for double or multiple hop scenarios, the WINDOWS client agent application may need to be capable of passing virtual channel data through to the end user's client agent application.

Referring to the interaction diagrams in FIGS. 7 and 8, as there is potential for high network latency between client 1102 and server 1104, when over a mobile network, congested network or physically distance link, the exchange of messages between these components may be asynchronous. For instance, after the client 1102 sends the activation gesture, it does not wait for a response. The client continues to function as normal and will only respond when (and if) a zoom request is received. To mask the network round-trip-time from the user and to seem responsive, the client 1102 may display a visual indicator to the user that a contextual zoom activation gesture was detected and a contextual zoom action is pending.

Moreover, while certain illustrative embodiments have been described and shown in the accompanying drawings, it is to be understood that such embodiments are merely illustrative of and not restrictive on the methods and systems described herein. In addition, one or more of the steps in the flowcharts may be optional and/or performed in an order different than that depicted in the flowcharts. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method comprising:
   receiving, by a processor of a user computing device, a predetermined user gesture on a touchscreen user interface of the user computing device, wherein the predetermined user gesture is configured to activate a request for bound based contextual zooming;
   generating, by the processor of the user computing device, information corresponding to the predetermined user gesture and comprising coordinate points of the predetermined user gesture;
   receiving, by the processor of the user computing device, contextual zoom metrics comprising a zoomed area and a zoom factor, wherein the contextual zoom metrics are calculated using at least the information corresponding to:
      the predetermined user gesture,
      one or more user interface elements to be displayed within the zoomed area on the touchscreen user interface of the user computing device, and
      a minimum rendered element size of the one or more user interface elements;
   determining, by the processor of the user computing device, an incompatibility between rendering the one or more user interface elements using the minimum rendered element size and the zoomed area;
   selecting, by the processor of the user computing device and based on the incompatibility, a proper subset of the one or more user interface elements to be displayed in the zoomed area, wherein rendering the proper subset using the minimum rendered element size is compatible with the zoomed area;
   retrieving, by the processor of the user computing device, an area of interest in an image stored in a video buffer of the user computing device corresponding to the proper subset;
   stretching, by the processor of the user computing device, at least a portion of the retrieved area of interest in the image based on the zoom factor; and
   causing, by the processor of the user computing device, a display of a zoomed overlay of the stretched portion of the retrieved area of interest in the image on a portion of the touchscreen user interface.

2. The method of claim 1, wherein the user computing device communicates via at least a remote presentation protocol with a virtualization server, the method further comprising:
   receiving, by the virtualization server, the information corresponding to the predetermined user gesture; and
   calculating, by the virtualization server, the contextual zoom metrics.

3. The method of claim 2, further comprising:
   determining, by the virtualization server, that contextual zooming information is available; and
   responsive to the determination, calculating, by the virtualization server, the contextual zoom metrics using the available contextual zooming information.

4. The method of claim 1, wherein the contextual zoom metrics are calculated further using information corresponding to:
   clickable user interface (UI) elements,
   screen size of the user computing device,
   device screen pixel density of the user computing device, and
   current orientation of the user computing device.

5. The method of claim 1, further comprising:
   determining, by the processor of the user computing device, to automatically close the zoomed overlay; and
   responsive to the determination:
      closing, by the processor of the user computing device, the zoomed overlay; and
      reverting the touchscreen user interface to its state before the receiving of the predetermined user gesture.

6. The method of claim 1, wherein the coordinate points of the predetermined user gesture correspond to a multi-finger tap defining the area of interest.

7. The method of claim 6, wherein the multi-finger tap comprises:
   two fingers simultaneously on the touchscreen user interface, wherein the two fingers comprise:
      a first finger near a first corner of the area of interest, and
      a second finger near an opposite, far corner of the area of interest.

8. The method of claim 1, wherein the contextual zoom metrics are calculated using a first minimum rendered element size for a first user and using a second minimum rendered element size for a second user, wherein the first minimum rendered element size is different from the second minimum rendered element size.

9. The method of claim 1, further comprising:
   determining, by the processor of the user computing device, to automatically switch to a second zoomed area based on a change in the touchscreen user interface; and
   responsive to the determination:
      retrieving, by the processor of the user computing device, a second area of interest in the image stored in the video buffer of the user computing device corresponding to the second zoomed area;
      stretching, by the processor of the user computing device, at least a portion of the second area of interest in the image based on the zoom factor; and
      causing, by the processor of the user computing device, a display of a second zoomed overlay of the stretched portion of the second area of interest in the image on a second portion of the touchscreen user interface.

10. The method of claim 1, further comprising:
   receiving, by the processor of the user computing device, a second predetermined user gesture, wherein the second predetermined user gesture is configured to expand the zoomed area; and
   responsive to receiving the second predetermined user gesture:
      receiving, by the processor of the user computing device, second contextual zoom metrics calculated using at least coordinate points of the second predetermined user gesture, wherein the second contextual zoom metrics comprise a second zoomed area and a second zoom factor;
      retrieving, by the processor of the user computing device, a second area of interest in the image stored in the video buffer of the user computing device corresponding to the second zoomed area;
      stretching, by the processor of the user computing device, at least a portion of the second area of interest in the image based on the second zoom factor; and
      causing, by the processor of the user computing device, a display of a second zoomed overlay of the stretched portion of the second area of interest in the image on a second portion of the touchscreen user interface.

11. The method of claim 1, wherein the predetermined user gesture is initiated from a point outside of the touchscreen user interface.

12. The method of claim 1, wherein the minimum rendered element size is measured in device-independent units.

13. A method comprising:
receiving, by a processor of a server, from a user computing device, a request to activate a bound based contextual zoom, wherein the request comprises information indicative of touchscreen coordinate points;
calculating, by the processor, using at least the information comprised in the request, using a minimum rendered element size, for a first user, of one or more user interface elements within a zoomed area on the user computing device, and using a second minimum rendered element size for a second user, contextual zoom metrics comprising the zoomed area and a zoom factor, wherein the zoomed area defines a bound area of interest, and wherein the minimum rendered element size is different from the second minimum rendered element size;
determining, by the processor, an incompatibility between rendering the one or more user interface elements using the minimum rendered element size and the zoomed area;
selecting, by the processor and based on the incompatibility, a proper subset of the one or more user interface elements compatible with the zoomed area; and
transmitting, by the processor, the contextual zoom metrics and an indication of the proper subset.

14. The method of claim 13, further comprising:
receiving, by the processor of the server, information corresponding to at least one user gesture input into one or more user interface controls in the zoomed area; and
processing, by the processor, the information corresponding to the at least one user gesture to communicate via a remote presentation protocol with the user computing device.

15. The method of claim 13, wherein the calculating the zoomed area is performed using touchscreen coordinate points comprising a first point defining a first corner of the bound area of interest and a second point defining an opposite, far corner of the bound area of interest.

16. The method of claim 13, further comprising:
receiving, by the processor of the server and from the user computing device, a notification of closing of the bound based contextual zoom.

17. The method of claim 13, further comprising:
determining, by the processor of the server, that contextual zooming information is available; and
responsive to the determination, calculating, by the processor of the server, the contextual zoom metrics using the available contextual zooming information.

18. A system comprising a client agent installed on a user computing device in communication via a remote presentation protocol with a virtualized application executing on a virtualization server, the system comprising:
the user computing device comprising at least a touchscreen user interface (UI) and a computer memory storing computer-executable instructions for a bound based contextual zoom feature that, when executed by a processor of the user computing device, cause the user computing device to:
receive a predetermined user gesture on the touchscreen UI, wherein the predetermined user gesture is configured to activate a request for bound based contextual zooming;
transmit information corresponding to the predetermined user gesture comprising coordinate points of the predetermined user gesture;
receive a proper subset of one or more user interface elements and at least zoomed area and zoom factor values, wherein the zoomed area comprises a portion of the touchscreen UI;
retrieve an area of interest in an image stored in a video buffer of the user computing device corresponding to the zoomed area and the proper subset;
stretch the retrieved area of interest in the image based on the received zoom factor value, wherein the stretching comprises applying anti-aliasing and image interpolation to the retrieved area of interest in the image; and
cause a display on the touchscreen UI of a zoomed overlay of the stretched retrieved area of interest in the image; and
the virtualization server comprising a computer memory storing computer-executable instructions for the bound based contextual zoom feature that, when executed by a processor of the virtualization server, cause the virtualization server to:
receive, from the user computing device, information corresponding to the predetermined user gesture configured to activate bound based contextual zooming, comprising coordinate points;
calculate at least the zoom factor using at least the received information corresponding to the predetermined user gesture and a minimum rendered element size of the one or more user interface elements to be displayed within the zoomed area on the touchscreen UI;
determine an incompatibility between rendering the one or more user interface elements using the minimum rendered element size and the zoomed area on the touchscreen UI,
select, based on the incompatibility, the proper subset of the one or more user interface elements, wherein the rendered proper subset is compatible with the zoomed area; and
transmit at least the adjusted zoom factor.

19. The system of claim 18, wherein the virtualized application is a legacy application designed for execution at a desktop computing device with a pointing device, and wherein the remote presentation protocol comprises HDX protocol.

* * * * *